United States Patent Office 3,343,971
Patented Sept. 26, 1967

3,343,971
RUST PREVENTIVE COMPOSITION
Walter K. Range, Jr., Elizabeth, N.J., and Eugene E. Tompkins, Winchester, Mass., assignors to Esso Research and Engineering Company, a corporation of Delaware
No Drawing. Filed Feb. 8, 1963, Ser. No. 257,111
2 Claims. (Cl. 106—14)

This invention relates to rust preventive compositions and particularly to rust preventive compositions of the so-called solvent and film type. Such compositions leave an adherent film after application, which film gives prolonged protection to the surface.

As is well known in the art, the rusting of ferrous metals is a series problem and numerous compositions have been proposed, including various slushing oils and film-forming materials, to prevent or at least to appreciably reduce the damaging effect of rust, particularly in a humid environment. Various materials have been used in these prior art rust preventive compositions. For example, U.S. 2,408,971 employs a proportion of a natural fat such as degras in combination with a sodium sulfonate and a material such as the monobutyl ether of ethylene glycol dispersed in a suitable solvent. Additionally, various other film-forming materials have been utilized in place of degras; for example, U.S. Patent 2,389,090 discloses the use of the so-called "Alox Acids," which are defined therein as relatively high molecular weight, generally saturated, carboxylic acids derived from petroleum or similar mineral hydrocarbon mixtures by a controlled partial oxidation process.

The present invention resides in a combination of three known additives in a suitable solvent. While the ingredients of the combination of the composition have been utilized separately in various prior art rust preventive formulations, the present invention is directed to a very specific and critical combination of these ingredients, which combination is capable of satisfying the corrosion requirements of Military Specification MIL-C-16173B, and which additionally provides further unexpected and improved properties as compared to similar prior art compositions.

In general, the compositions of the present invention comprise barium sulfonate; a material having the formula R—O—alkylene—O—R' wherein R and R' are as hereinafter defined and wherein a specific example of this type of material is the monobutyl ether of ethylene glycol commonly referred to as butyl "Cellosolve"; and, as a film-forming material, an oxidized acid hydrocarbon derived from the oxidation of refined lubricating oil stocks and waxes; all of the ingredients being contained in a suitable solvent.

The specific combination of the above ingredients provides a markedly superior rust preventive composition in various respects. For example, it has been found in connection with the present invention that the use of barium sulfonate in contradistinction to various other commonly used sulfonates and particularly to sodium sulfonate permits a surprisingly rapid separation of water from the solvent into which the barium sulfonate is incorporated. This property is highly desirable in dipping and coating operations. For example, in the protection of metal parts from corrosion between certain machining or manufacturing steps prior to storage or packaging, the parts to be protected are often coated with an undesirable film of water which may come from cooling or cutting fluids, rinsing baths, or from condensation of water vapor from the atmosphere, which water film obviously enhances the corrosion of the metallic surfaces. The application of the rust preventive composition is normally effected by passing the metallic parts through a dipping tank, and, as a result, the anherent water film on the metal parts naturally contaminates the rust preventive composition as the dipping process procecess. After a sufficient number of parts have been passed through the dipping tank, the amount of water collected in the tank frequently increases to a high enough level to form a solvent-water emulsion, which emulsion is then unavoidably applied to subsequent parts. Thus, in order to prevent coating subsequent parts with the resulting water-contaminated rust preventive composition, the dipping tank must be periodically emptied and replaced with fresh rust preventive composition, which procedure is naturally undesirable and uneconomical. One common solution to this problem is to remove the water film from the metal parts by passing them through a heated drying oven prior to the dipping of the parts into the rust preventive. This process is also undesirable from an economic standpoint. An alternative solution to the problem is to incorporate into the rust preventive composition a material which will preferentially adsorb onto the metallic surface to thereby displace any residual moisture and permit a continuous rust preventive coating. Again, the addition of this supplemental material adds to the expense of the coating process. As mentioned above, the utilization of barium sulfonate in the rust preventive composition has surprisingly been found to enable an easily demulsifiable emulsion to be formed between the solvent and water, thereby permitting a rapid separation of the water and solvent when the two are mixed. By this means, the water film adhering to the metal parts being passed through the dipping tank containing the rust preventive composition rapidly falls to the bottom of the tank with minimal emulsification tendency, thereby forming a lower water layer which will be out of reach of the metal parts. At the same time, since the barium sulfonate also serves as an effective antirust agent, a convenient and inexpensive method of eliminating the detrimental effects of the contaminating water is provided.

A further unexpected advantage of the compositions of the present invention accrues from the use of the oxidized acid hydrocarbon material. While various film-forming materials such as degras have been commonly utilized in the prior art compositions, it has been found that their replacement by the oxidized acid hydrocarbon material eliminates undesirable properties. For example, the degras in similar blends has a tendency to form a flocculent white precipitate upon extended storage, which tendency is surprisingly eliminated by the use of the oxidized acid hydrocarbon material.

In addition to the above-mentioned storage and water separation advantages, the compositions of the present invention have also been found to yield superior corrosion protection when compared with other similar and prior art formulations.

In particular, the compositions of the present invention will comprise a major proportion, e.g. about 25 to 95 wt. percent, of a suitable hydrocarbon solvent; about 1 to 35 wt. percent, preferably about 2 to 15 wt. percent, of barium sulfonate; about 3 to 30 wt. percent, preferably about 5 to 15 wt. percent, of the oxidized acid hydrocarbon material; and about 0.5 to 10 wt. percent, preferably about 1 to 6 wt. percent, of the material having the formula R—O—alkylene—O—R'. Additional additives may of course be contained in the rust preventive composition, such as antioxidants, metal deactivators, dyes, and other useful additives.

The barium sulfonate employed may be either the neutral or basic type, depending upon the performance required. Neutral barium sulfonate will be desired when nonferros metal corrosion is a problem. The barium sulfonates are prepared by neutralizing sulfonic acids with a suitable barium base. The sulfonic acids operable for forming the sulfonates may be derived either from petroleum or from synthetic alkyl aromatics. Sulfonic acids are ordinarily obtained by treatment of a lubricating oil fraction or an alkyl aromatic with fuming sulfuric acid. However, synthetic sulfonic acids may also be used. For instance, polypropyl benzene sulfonic acid, polypropyl naphthalene sulfonic acid, etc., are operable. Suitable acids will generally have molecular weights within the range of about 200 to 1500, with an average molecular weight of about 300 to 800. For the purposes of this invention, it is preferred to use a sulfonic acid having an average molecular weight of about 400 to 500.

The oxidized acid hydrocarbon material is derived from the oxidation of petroleum fractions. Specifically, suitable materials may be obtained from the oxidation of well-refined lubricating oil stocks which are substantially free from crystalline bodies, asphalts and unsaturated hydrocarbons. Suitable materials may also be obtained by the process of U.S. Patent 2,184,952, which discloses a low temperature liquid phase catalytic oxidation of hydrocarbon wax at atmospheric pressure to produce an acidic residue which may be vacuum distilled. Additionally, other suitable products of this general type are described in U.S. Patent 2,389,090, which discloses a series of acids derived from the oxidation of petroleum lubricating oil, and the calcium soaps thereof. In particular, suitable oxidized acid hydrocarbon materials will generally have the following physical properties:

Acid No. (ASTM D–974) _____ 30 to 90
Saponification value (Reflux), mgs. KOH/
  gram _____ 80 to 180
Molecular weight (average) _____ 500 to 700

The R—O—alkylene—O—R' additive contained in the compositions of the present invention will generally have a boiling range of about 100 to 300° C. at atmospheric pressure. R in the above formula is either hydrogen or an alkylol radical, e.g. ethylol; alkylene represents a bivalent radical such as methylene, ethylene, etc.; and R' is either hydrogen, an alkyl radical, e.g. methyl, ethyl, propyl, etc., or an aryl radical such as phenyl. In instances where both R and R' are hydrogen, the alkylene radical should contain at least 4 and no more than 10 carbon atoms. Specific representative compounds of this class of material are monomethyl ether of ethylene glycol, monobutyl ether of ethylene glycol (commonly referred to as butyl "Cellosolve"), 1-phenoxy 2-hydroxy propane, and 2-methyl 2,4-pentane diol.

The solvent utilized in the compositions of the invention may be either volatile or nonvolatile and generally is a mineral oil product such as Stoddard solvent; naphthas, preferably those naphthas having initial boiling points of about 180° F. to 310° F., and final boiling points of about 210 to 500° F.; gas oil; lubricating oil, preferably having a viscosity of about 35 to 1000 SSU at 210° F., etc. It will be particularly preferred to utilize a volatile hydrocarbon solvent boiling within the range of about 200 to 500° F., preferably 300 to 400° F.

The compositions of the invention may be applied to the surfaces to be protected by dipping, brushing, or spraying.

The invention will be more fully understood by reference to the following examples.

*Example 1*

In order to demonstrate the superiority of barium sulfonate when compared to other types of sulfonates, three rust preventive compositions, labeled A, B. and C, were prepared. Compositions A, B, and C were identical except for the type of sulfonate used. Each composition contained the following ingredients in the following proportions: 10 wt percent of an oxidized acid hydrocarbon (100 wt. percent active ingredient), 6 wt. percent of an oil solution of a metal sulfonate (50 wt. percent active ingredient), 3 wt. percent of the monobutyl ether of ethylene glycol (butyl "Cellosolve"), (100 wt. percent active ingredient), and 81% of a kerosene-type diluent, commonly referred to as "Varsol", having a 320 to 400° F. boiling range. The oxidized acid hydrocarbon had an acid number of about 70 (ASTM D–974), a saponification number of about 150 (ASTM D–94), and an average molecular weight of about 622. It is commercially available under the trade name "Alox 700" supplied by the Alox Corporation. Compositions A, B, and C respectively contained barium, calcium, and sodium sulfonate. Each blend was combined with water in the ratio of 60 parts of rust preventive composition to 40 parts water and shaken vigorously in a glass cylinder to form an emulsion. Each cylinder was then allowed to stand and the time for separation of water from solvent was measured. The following table summarizes the results of these tests.

TABLE I

Sulfonate type:            Time to separate water
  Barium _____ 2–3 min.
  Calcium _____ 20–30 min.
  Sodium _____ Only partial after several months.

As shown in the above table, the barium sulfonate is strikingly superior to either the calcium or the sodium sulfonate. In particular, the sodium sulfonate showed an incomplete separation even after several months, whereas the barium sulfonate showed an almost immediate water separation. This result is particularly significant in that sodium sulfonate has been quite commonly used in similar rust preventive compositions. The advantage of the rapid water separation enabled by the use of barium sulfonate is valuable as hereinbefore mentioned in the dip coating operations for applying rust preventive compositions.

*Example 2*

In order to demonstrate the beneficial effect of using the oxidized acid hydrocarbon material in place of the prior art degras, three blends were prepared with the ingredients of Example 1. Each blend was subjected to a stability test which comprised storage in test tubes for 8 hours at 140° F., followed by 16 hours at −40° F. This procedure was repeated four times, after which the samples were stored for 24 additional hours at room temperature. At the end of this latter period, the volume of settled precipitate in each test tube was observed as a measure of the percentage fluocculent precipitate.

The results of this test, together with the compositions of the three blends, are shown in the following table.

TABLE II

| Ingredients, wt. percent | Blend | | |
|---|---|---|---|
| | A | B | C |
| Barium Sulfonate [1] | 6.0 | 6.0 | |
| Sodium Sulfonate [2] | | | 8.0 |
| Butyl "Cellosolve" | 3.0 | 3.0 | 3.0 |
| Oxidized Acid Hydrocarbon [3] | 14.0 | 7.0 | |
| Degras (neutral) [4] | | | 10.0 |
| Solvent ("Varsol") | 77 | 84 | 79.0 |
| Percent Flocculent Precipitate after Stability Test | Trace | Nil | 26 |

[1] 50 wt. percent active ingredient in neutral mineral oil. Molecular weight of about 1,050 (Ba salt).
[2] 60 wt. percent active ingredient in neutral mineral oil. Molecular weight of about 480.
[3] 100 wt. percent active ingredient.
[4] 100 wt. percent active ingredient.

As shown in the above table, blends similar to the compositions of the present invention containing degras instead of the oxidized acid hydrocarbon material exhibit a high amount of flocculent precipitate upon storage. As noted, blends A and B in the above table, which represent the compositions of the invention, exhibited extremely little, if any, precipitate.

Example 3

Composition A of Example 1 containing barium sulfonate was utilized to test metal specimens of six different metals, according to the corrosion test, Sec. 3.9 of military specification MIL-C-16173B. This test comprises cleaning, polishing and coating metal specimens as prescribed in Sec. 4.5 of the specification, followed by immersion in the test composition. The metals tested were aluminum, brass, cadmium, magnesium, steel and zinc. The results of these tests are shown in the following table, which indicates the maximum corrosion loss permissible according to the military specification together with the results of two compositions of the present invention. As shown, one composition contained a neutral barium sulfonate and the other composition contained a basic barium sulfonate.

following table, the solvent, butyl "Cellosolve," degras, oxidized acid hydrocarbon, and barium sulfonate were the same as utilized in the previous examples. The sodium sulfonate in the following table was utilized as a 60 wt. percent active ingredient in neutral mineral oil and had an average molecular weight of about 445–480. The calcium sulfonate in the following table was utilized as a 30 wt. percent active ingredient in neutral mineral oil and had an average molecular weight of about 950. The magnesium sulfonate in the following table was utilized as a 30 wt. percent active ingredient in neutral mineral oil and had an average molecular weight of about 920.

The results of the humidity cabinet test are expressed as the average days to failure of the test panels (average of 3 samples). Failure in this test was taken as the appearance of one or more dots of rust larger than 1 mm. in diameter or four or more dots of any size.

TABLE IV
[Evaluation of compositions of the invention—Humidity cabinet test]

| Composition (wt. percent), Blend No. | Invention Compositions | | | | | Comparison Compositions | | | | | | |
|---|---|---|---|---|---|---|---|---|---|---|---|---|
| | 1 | 2 | 3 | 4 | 5 | 6 | 7 | 8 | 9 | 10 | 11 | 12 |
| Solvent ("Varsol") | 79 | 75 | 77 | 79 | 81 | 89 | 79 | 79 | 81 | 83 | 88 | 88 |
| Butyl "Cellosolve" | 3 | 3 | 3 | 3 | 3 | 3 | 3 | 3 | 3 | 3 | 3 | 3 |
| Degras (Neutral) | | | | | | | 10 | | | | | |
| Oxidized Acid Hydrocarbon | 10 | 16 | 14 | 12 | 10 | 5 | | 10 | 10 | 14 | 5 | 5 |
| Barium Sulfonate [1] | 8 | 6 | 6 | 6 | 6 | 3 | | | | | | |
| Sodium Sulfonate [2] | | | | | | | | 8 | 8 | | 4 | |
| Ca Sulfonate [3] | | | | | | | | | | | | 4 |
| Mg Sulfonate [4] | | | | | | | | | 6 | | | |
| Humidity Cabinet Test: Average days to failure | [5] 35+ | 29 | 29 | [5] 35+ | 27 | 18 | 18 | 16 | 1 | 13 | 5 | 4 |

[1] 45–50 wt. percent active ingredient.
[2] 60 wt. percent active ingredient.
[3] 30 wt. percent active ingredient.
[4] 30 wt. percent active ingredient.
[5] No failure on two out of three test panels when test was terminated at 35 days.

TABLE III
[Corrosion losses in Mg./cm.² surface]

| Metal Specimen | Government Spec. MIL-C-16173B Maximum Allowed | Composition of Invention with— | |
|---|---|---|---|
| | | Neutral Barium Sulfonate (av. of 4 tests) | Basic Barium Sulfonate |
| Aluminum | 0.2 | .007 | .004 |
| Brass | 1.0 | .16 | .068 |
| Cadmium | 5.0 | 1.24 | 1.37 |
| Magnesium | 0.5 | .235 | 1.01 |
| Steel | 0.2 | .012 | .003 |
| Zinc | 7.5 | 1.76 | .62 |

As shown in the above table, the compositions of the invention containing either neutral barium sulfonate or basic barium sulfonate are generally capable of passing the stringent Military Specification set forth above. In all cases, except for basic barium sulfonate with magnesium, the results are seen to be well below the maximum permissible values.

Example 4

In order to evaluate the compositions of the invention as compared to various prior art compositions and comparison compositions containing varying amounts of ingredients, a series of blends was prepared as set forth in the following table. The blends were subjected to a standard humidity cabinet test according to ASTM D1748-60T. This test comprises suspending polished steel strips coated with the test composition in moist air which is maintained at a uniform high temperature and at a relative humidity of 100%. The tests were conducted at 120° F. In the As shown in the above table, the compositions of the invention, i.e. blends Nos. 1 to 5, were markedly superior in the humidity cabinet test to any of the comparison compositions, i.e. blends 6 to 12. In particular, comparison may be made between the following blends. Comparison of blends 1 and 7 indicates that substitution of the oxidized acid hydrocarbon for the degras of blend 7 markedly improves the rust protection. Comparison of blends 5 and 8 indicates that the inclusion of a lesser proportion of barium sulfonate (blend 5) provides greater rust protection than does inclusion of a larger amount of sodium sulfonate (blend 8). Similarly, comparison of blends 5 and 9 indicates the superiority of barium sulfonate to magnesium sulfonate. Additionally, the results of the test with blend 10 indicate that the exclusion of any type of sulfonate will reduce the amount of rust protection even though the proportion of oxidized acid hydrocarbon is increased. The results obtained with blends 11 and 12 indicate the criticality in the proportions of the various ingredients. Hence, the rust protection decreased with decreasing amounts of oxidized hydrocarbon and sulfonate.

In summary, the compositions of the invention provide excellent rust protection as compared to various prior art compositions as well as various comparison compositions containing varying proportions of ingredients. The type and proportions of the ingredients of the compositions of the invention may therefore be regarded as critical.

What is claimed is:
1. A method of protecting ferrous metal surfaces, covered with an undesirable film of water, from rusting which comprises dipping said surfaces into a rust preventive composition comprising a major amount of a volatile hydrocarbon solvent boiling within the range of 200° to 500° F.; 2 to 15% of barium salt of an alkyl aromatic sulfonic acid having an average molecular weight of about 300 to 800; 5 to 15 wt. percent of an oxidized acid hydro- carbon material having an Acid No. of 30 to 90, a Saponification Value of 80 to 180 mgs. KOH/gm., and an average molecular weight of about 500 to 700; and 1 to 6 wt. percent of a hydroxy material of the formula: HO—alkylene—O—R, wherein R is selected from the group consisting of hydrogen and alkyl radicals, and said alkylene is a $C_1$ to $C_2$ alkylene group.

2. A method of protecting ferrous metal surfaces as in claim 1 wherein the hydroxy material contained in the rust preventive composition is monobutyl ether of ethylene glycol.

References Cited

UNITED STATES PATENTS

| | | | |
|---|---|---|---|
| 2,383,033 | 8/1945 | Adams et al. | 106—14 |
| 2,796,408 | 6/1957 | Brehm et al. | 106—14 |
| 2,900,262 | 8/1959 | Green | 106—14 |
| 2,958,603 | 11/1960 | Sheldahl | 106—14 |
| 3,080,330 | 3/1963 | Rudel et al. | 106—14 |

ALEXANDER H. BRODMERKEL, *Primary Examiner.*

L. B. HAYES, *Assistant Examiner.*